United States Patent [19]

Wagstaff et al.

[11] 3,729,143
[45] Apr. 24, 1973

[54] FORAGE HARVESTER CUTTING REEL AND GAUGE PINS FOR POSITIONING THE CUTTING BLADES THEREON

[75] Inventors: Robert A. Wagstaff; Thomas W. Waldrop, both of New Holland, Pa.

[73] Assignee: Sperry Rand Corporation, New Holland, Pa.

[22] Filed: Apr. 29, 1971

[21] Appl. No.: 138,539

[52] U.S. Cl. ............... 241/282.2, 56/294, 51/48 HE, 51/249, 83/665
[51] Int. Cl. .............................................. B02c 18/20
[58] Field of Search .............. 146/120, 117 R, 117 A, 146/121 A, 242; 51/249, 48 HE; 56/294; 83/356.3, 355, 665, 677; 241/282.2

[56] References Cited

UNITED STATES PATENTS

| | | | |
|---|---|---|---|
| 3,386,483 | 6/1968 | Waldrop et al. | 146/117 R |
| 3,370,628 | 2/1968 | Waldrop | 146/242 |
| 2,944,376 | 7/1960 | Buttke | 51/249 |

FOREIGN PATENTS OR APPLICATIONS

| | | | |
|---|---|---|---|
| 2,147 | 1/1914 | Great Britain | 51/249 |

Primary Examiner—Andrew R. Juhasz
Assistant Examiner—Z. R. Bilinsky
Attorney—John C. Thompson, Joseph A. Brown and James J. Kennedy

[57] ABSTRACT

A forage harvester has a cutting reel of three pairs of radially extending supporting plates with each supporting plate having two concentric rows of equally spaced mounting holes for passing bolts to fasten cutting blade mounting blocks between the plates of a given pair. The blocks project beyond the edges of the blades and have contoured end surfaces to seat spirally shaped cutting blades on the blocks. The blades are bolted to the blocks so that these bolts will shear more readily than the mounting bolts through the plates. The blades are positioned on the mounting blocks by retractable gauge pins exteriorly positioned on the opposite side walls of the forage harvester a radial distance equal to the radial distance from the center of the cutting reel to the shear bar.

12 Claims, 8 Drawing Figures

Patented April 24, 1973
3,729,143
2 Sheets-Sheet 1
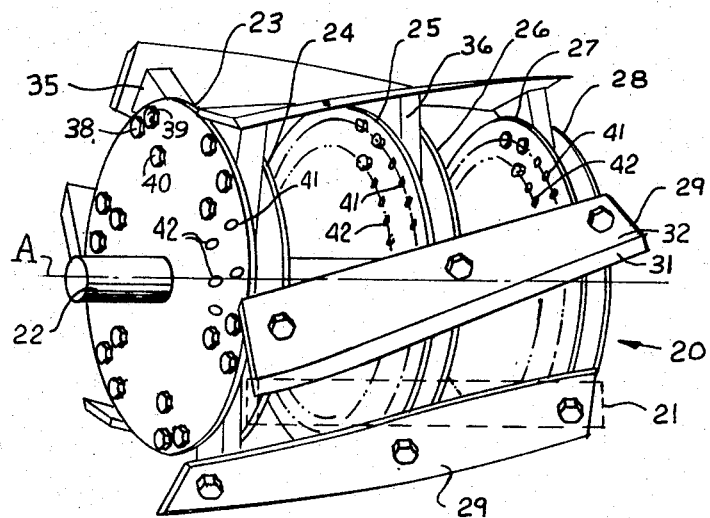
Fig 1
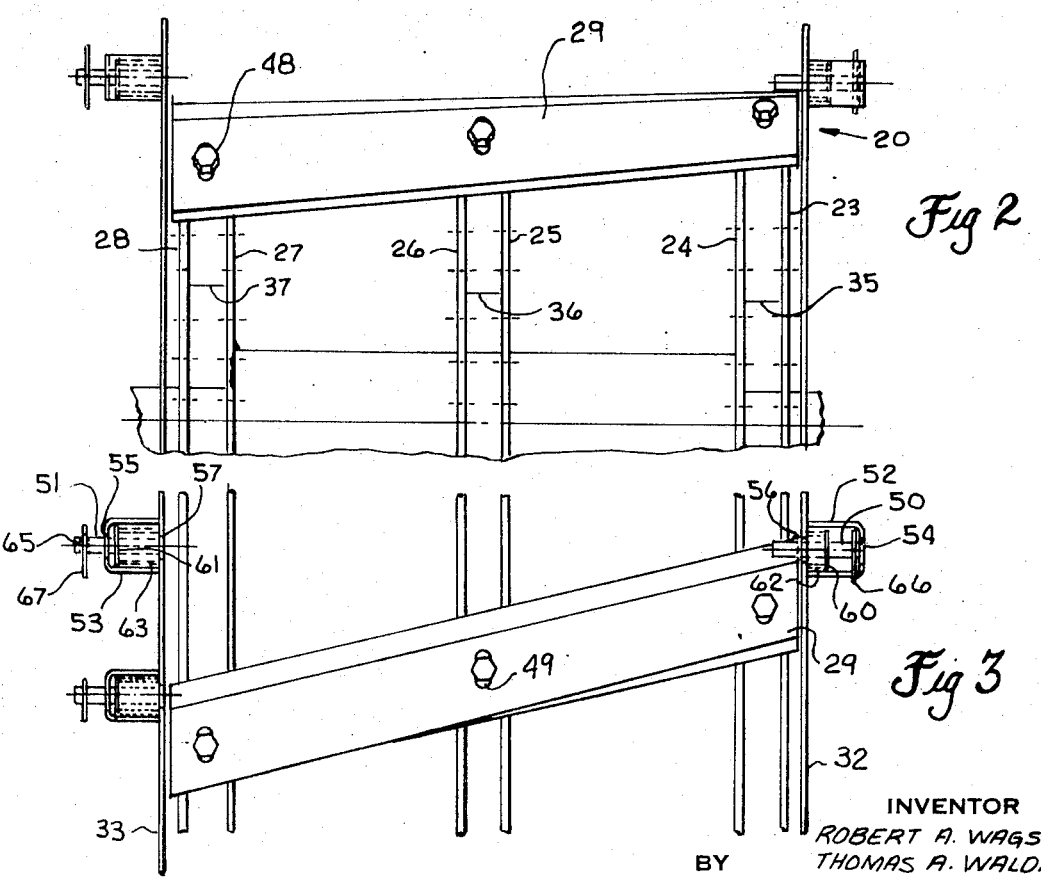
Fig 2
Fig 3
INVENTOR
ROBERT A. WAGSTAFF
THOMAS A. WALDROP
BY
George C. Bower
ATTORNEY

INVENTOR
ROBERT A. WAGSTAFF
THOMAS A. WALDROP
BY
ATTORNEY

FORAGE HARVESTER CUTTING REEL AND GAUGE PINS FOR POSITIONING THE CUTTING BLADES THEREON

This invention relates to the cutting reel of a cutterhead and is directed particularly to the mounting of the cutting blades.

Forage harvesters convert long cut crops to small silage pieces by longitudinal extending cutting blades rotating at a high speed on a cutting reel and chopping or severing the cut crop against a shear bar. The crops may be reduced to silage in the field as they are harvested or at the storage facilities. The crops are reduced to the small piece silage for ease of handling and storage. In the field, the silage is discharged into a trailing wagon which may be readily unloaded into a trench silo or blown up into a vertical silo.

The cut crops occasionally have debris in the form of iron or wood or the like which may be fed into the cutting reel. The cutting blades may strike this debris with considerable force and be damaged by the impact. In the previous cutting reel of forage harvesters, the force on the blade would be transferred to the radial supporting plates causing damage and rupture of the plates. This type of damage is highly undesirable. It requires the replacement or repair of the main part of the cutting reel. This can be expensive as well as time consuming and at locations unconvenient to repair the damage.

Also very important is the cutting relation of the blades and shear bar in order to secure a reduction of the crop to small pieces. In some forage harvesters the blades are separately ground and remounted on the reel. The blades are precisely set by the insertion of a gauge between the edge of the shear bar and each blade. Other types of forage harvesters have a sharpener attached thereto in the form of an abrasive stone. The blades are set against a precisely positioned abrasive stone or other gauge means. The reel is then rotated in reverse for sharpening by the grinding stone. The shear bar is positioned in relation to the cutting blades. This avoids the setting of each blade in relation to the shear bar. The stone, however, is not rigidly mounted and is subject to chipping as the blades are used as a gauge. In other forage harvesters positioning lugs extend radially inward from the casing and form a reference surface in which the cutting blades may be positioned by leaf gauges fitting between these surfaces and the edge of the cutting blades. This has a disadvantage of the reference surfaces being very close to the cutting blades when rotating and requiring leaf gauge setting for each blade. These surfaces also may become fouled in the course of operation of the forage harvester.

It is therefore the purpose of this invention to provide mountings for spiral cutting blades of a forage harvester that minimize the possibility of damage to the supporting plates upon the application of an excessive force to the cutting blades, and a further purpose is to provide means to properly and easily position the cutting blades in a convenient and rapid manner.

OBJECTS AND SUMMARY OF THE INVENTION

An object of this invention is to provide a cutting reel of a forage harvester with cutting blade mountings that minimizes the possibility of damage to the supporting plates on damaging force being applied to the cutting blades.

Another object of the invention is to provide individual mountings of the cutting blades on each supporting plate means.

Another object of the invention is to provide a cutting reel in which the cutting blades and mounting blocks may be readily mounted and removed.

Another object of the invention is to provide a cutting reel having means whereby the number of cutting blades may be readily changed.

Another object of the invention is to provide a sturdy and rugged cutting reel in which the cutting blades may be readily rearranged and the application of damaging force to the main part of the reel is minimized.

Another object of the invention is to provide cutting blade positioning means that are conveniently located for positioning the cutting blades and are retractable clear of the comminuting chamber.

In summary, the invention comprises a forage harvester with a cutting reel having axially spaced supporting means and having cutting blades detachably fastened to each supporting means by discrete mounting means which are detachably secured to a respective supporting means and further comprises blade positioning means exteriorly mounted on the forage harvester and insertable into the comminuting chamber for positioning the cutting blades on the mounting means.

These and other objects and advantages of this invention will be apparent from the following description and claims taken in connection with the accompanying drawings which illustrate the various features of this invention.

BRIEF DESCRIPTION OF THE DRAWINGS

FIG. 1 is a perspective view of the cutting reel with the shear bar shown in dash lines.

FIG. 2 is a top view of the cutting reel with one guide pin in gauging position and an opposing guide pin in a removed position.

FIG. 3 illustrates the top of the cutting reel with the guide pins offset to correspond to the spiral positioning of the cutting blade.

DETAILED DESCRIPTION OF THE INVENTION

Figure 4:
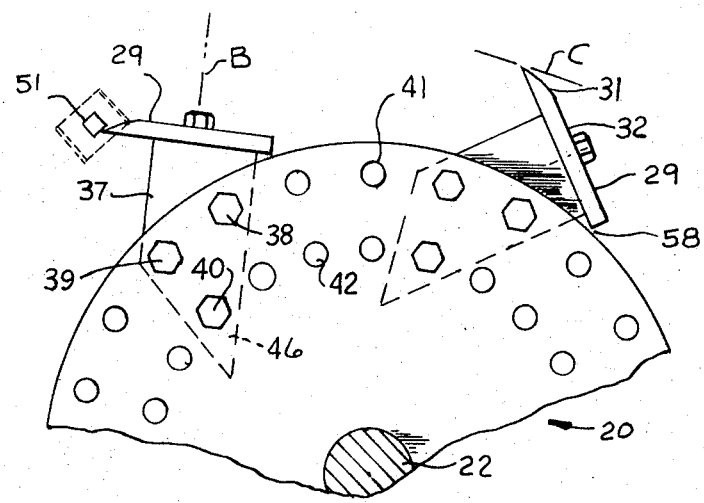
FIG. 4 is a fragmentary side view with the cutting blade mounted in six positions.

Referring to FIG. 1 of the drawings the cutting reel of the cutterhead of the forage harvester is only shown for simplicity of illustration. The shear bar 21 is indicated in dash lines in FIG. 1 with the cutting reel 20 shown in perspective and facing the incoming cut crops which are to be chopped by the rapidly rotating blades 29 against the stationary shear bar 21. The cutting reel has a reel shaft 22 which is supported in anti-friction bearings (not shown) mounted on the casing for rotation of the reel about an axis A. Six supporting plates 23 and 28 are mounted on and welded to the shaft 22 and extend radially perpendicularly therefrom. The six plates are grouped into three pairs with the plates of each pair spaced apart a small axial distance to receive the mounting blocks 35,36 and 37 between the respective pairs of supporting plates. The supporting plates are flat disc shaped members having circular edges. Two circular concentric rows of 24 holes are arranged around the plates for passing the mounting bolts 38,39 and 40 through the holes of the respective support plates. The outer row of holes 41 are adjacent the periphery of the supporting plates and the inner row of holes 42 are positioned radially inwardly from the holes of the outer row.

Figure 8:
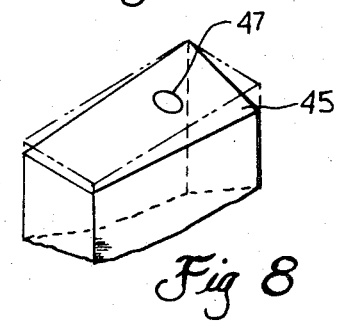
FIG. 8 is a perspective end view of the mounting block with the rectangular end indicated by dot-dash lines.

The mounting blocks 35,36 and 37 are rectangular in cross section and have a thickness corresponding to the space between the plates of a pair. The length extends inwardly between the plates and the width is in the circumferential direction of the plates. The inner triangular shaped ends of the mounting blocks are positioned between the support plates. The side surfaces are flat and parallel. The outer end surface 45 of the mounting block is contoured as illustrated in FIG. 8 to conform with the spiral shape of the cutting blade 29. In FIG. 8, a rectangular shaped end is illustrated in dot-dash lines to emphasize the contoured nature of the end surface. The portions of the mounting blocks fitting between the supporting plates have three holes. The inner end surface 46 of the mounting block is approximately at 45° to the main axis B of the block. Two of the mounting holes are centered parallel to the inner end surface. The other opening or hole in the block is positioned on a line approximately 45° to the line through the centers of the holes parallel to the inner end. The mounting block is positioned between the plates so that the hole at the apex of the triangular portion coincides with a hole in the inner row and the two other holes coincide with the holes of the outer row in the supporting plate. In this position the main axis B of the mounting plate is tilted in the order of about 40° to 45° to the radius of the supporting plate. This positions the cutting edge 30 of the blade so that it subscribes an arc C further from the center or main axis A than any other portion of the cutting reel. The surface 31 along the cutting edge and the beveled surface 32, spaced from the cutting edge, are in relief from this subscribed cutting circle C. Thus on passing the shear bar the leading cutting edge passes adjacent to the shear bar with the surfaces in relief therefrom. The cutting blade is mounted on the outer end surface of the mounting block which has a bolt hole 47 as illustrated in FIG. 8 for receiving the bolt 48 to secure the cutting blade to the mounting block. The cutting blade has transverse slots 49 for passing the bolts. The mounting bolts may be five-eights inch in diameter whereas the supporting plate bolts 38,39, 40 are one-half inch in diameter so that the combined shear strength of the three mounting bolts attached to the supporting plates is substantially greater than the mounting bolt on the end of the mounting block. Thus, on application of an excessive force to a cutting blade, the block mounting bolt 48 will rupture or fracture and not the supporting plate bolts 38–40. The supporting plate is of sufficient strength to resist any disrupting force of the block mounting bolts and therefore will not sustain any damage when an excessive force is applied to the cutting blade.

The cutting blades may slide back in the slots 49 without fracturing the bolt 48 on application of excessive force. The space 58 in back of the blade is clear to permit the blade to move back a distance without contacting a mounting or a supporting plate. If forced back far enough it may engage the periphery of the plates but not seriously damage the plates.

The pairs of supporting plates are offset so that the mounting holes of each pair are offset to position the mounting blocks along a spiral line to receive the spiral cutting blades. In the embodiment of FIGS. 1–4 there are six cutting blades mounted on the reel and spaced equal circumferential distances therearound. Since only half the holes of the outer row are being utilized for attaching the mounting blocks there are two holes between each set of mounting blocks.

Figure 6:
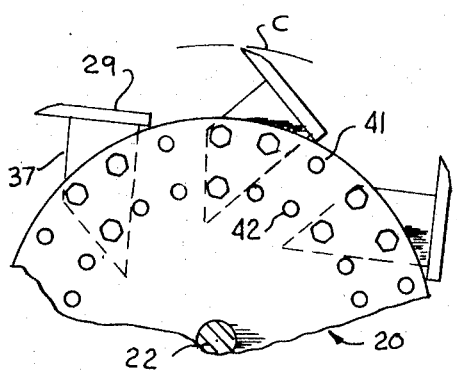
FIG. 6 is a fragmentary end view of the cutting reel with eight cutting blades.
Figure 7:
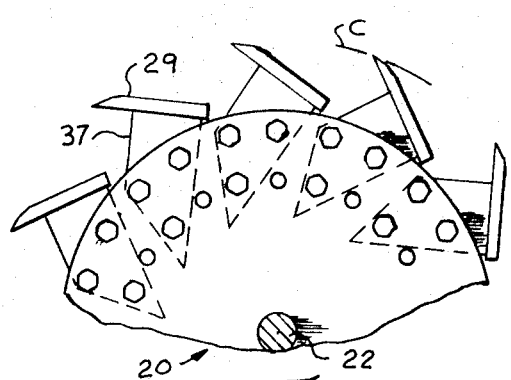
FIG. 7 is an end view of a cutting reel with twelve cutting blades thereon.
Figure 5:
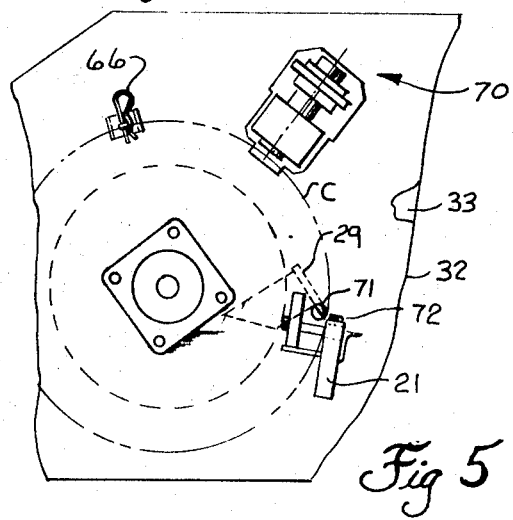
FIG. 5 is a fragmentary side view of the cutting reel and shear bar.

In FIG. 6 the mounting blocks are positioned closer together with a single hole of the outer row unused between the blocks. Eight cutting blades are mounted on the reel in this embodiment. In FIG. 7 twelve blades are mounted on the reel. The reel is set to different numbers of cutting blades by removing the supporting plate bolts and shifting the blocks to register with another set of holes. The supporting plate bolts are readily accessible from outside of the forage harvester.

CUTTING BLADE POSITIONING MEANS

In FIGS. 2–5 the guide pins 50,51 are illustrated for positioning the cutting blades 29 in relation to the shear bar 21. The guide pins are mounted in the side walls 32,33 of the communiting chamber and U-shaped brackets 52,53 extending perpendicularly from the outer surfaces of the side walls. The outer end of the brackets have openings 54,55 aligned with the respective openings 56,57 in the side wall so that the guide pins 50,51 are movable inwardly and outwardly. In FIG. 2 and FIG. 3 the openings are aligned and the pins are aligned. In FIG. 3 an offset guide pin is also shown so that the opposite ends of the spiral cutting blade engage the guide pins at the same time. The guide pins are spaced radially within the range of positions of the cutting edge of the shear bar. In this embodiment the guide pins 50,51 have square cross sections and the openings 54–57 in the side wall and brackets are also square to position and hold the guide pins. The guide pins 50,51 have pinned washers 60,61 and helical springs 62,63 within the brackets. The springs are between the respective side walls and washers to force the guide pins to the extracted position. Holes or bores 64,65 are provided in the outer end of the respective pins to receive the respective retention members 66,67. On positioning the guide pins in the inward or guide engaging position, the retention members are removed from the bores and reinserted on the inner side of the mounting brackets to carry the outward force of the helical springs and hold the guide pins in the inward position in the communiting chamber.

The advantages of the guide pins will be seen from the following description of the method of resharpening the blades of the cutting reel. Each cutting blade, after being loosely mounted on the mounting blocks, is positioned against the inwardly facing side surface of the guide pins. The bolts 48 are then tightened to hold each knife in its correct position. When all of the cutting blades are so positioned the guide pins are retracted and the reel driven in the reversed direction and the blades ground by the sharpener 70. When all of the blades are sharpened, the shear bar is adjusted against the cutting edge of one of the blades by charging the settings on the shear adjustable support 72. The positioning of the shear bar 21 may be done by feeling the bar in relation to the selected blade. However, the preferred and recommended method is to position a leaf gauge through opening 71 provided in the side walls 32,33 and measure the actual clearance between the cutting edge of the blade and the edge of the shear bar. The shear bar is positioned by the adjusting means 72 to the correct cutting clearance. Since due to the grinding process the edges of each cutting blade subscribes the same arc C, the setting of the shear bar in relation to one blade sets it into relation with all the blades.

Summary of Features and Advantages

The main features of this invention are the individual mounting of the cutting blade on each pair of supporting plates and the mounting bolts securing the cutting blade to the mountings giving way before the bolts securing the mountings to the supporting plates can give way. Another feature is the isolation of the cutting blades from the supporting plates. Damaging forces applied to the blade are initially applied to the mountings with a minimal possibility of these forces damaging essential parts of the supporting plates. The blades and mountings are easily replaced and the forage harvester repaired in short time. In prior harvesters the blades are fastened on the supporting plates in such a manner that the supporting plates are very likely to sustain serious damage. This requires a major overhaul of the cutting reel at a substantial greater cost and expenditure of time.

The cutting blade positioning means are conveniently located and stored exteriorly to the comminuting chamber. On positioning of the cutting blades the guide pins are easily inserted under spring pressure into the comminuting chamber in gauging position. The pins are located in the upper part of the forage harvester where the cutting blades are easily set in place.

This in combination with the accessibility of the mountings, greatly improves the replacement of the cutting blades on the reel and the repositioning of the blades in different number of sets of blades.

While this invention has been described in connection with a single embodiment it will be understood that this embodiment is capable of modification and that this application is intended to cover any variations, uses, or adaptations following in general the principles of the invention and including such departures from the present disclosure as come within known or customary practices of the art to which the invention pertains and as fall within the scope of the invention or the limits of the apended claims.

Having thus described our invention, what we claim is:

1. A forage harvester reel comprising a rotatably mounted shaft,
   a plurality of pairs of closely spaced apart disc-like supporting means having a generally circular outer periphery,
   said supporting means being axially spaced on an extending normal to said shaft and fixedly attached thereto,
   a plurality of cutting blades with each having a cutting edge,
   a plurality of discrete mounting blocks for each supporting means with a mounting block for one supporting means being separate from the mounting blocks of the other supporting means, each mounting block having a smooth end surface,
   first fastening means detachably securing said cutting blades to the respective end surfaces of said mounting blocks with said cutting blades extending generally transverse to the respective mounting blocks and said fastening means and said cutting blades providing for rearward displacement of said blades relative to the mounting block on application of excessive force thereto,
   second fastening means detachably securing said mounting blocks between pairs of respective supporting means with the smooth end surface extending outwardly of the generally circular outer periphery of said disc-like supporting means and with the mounting blocks being tilted from the radial opposite to the direction of rotation to position the respective cutting edges at the cutting periphery of the reel and to provide clearance to the rear of each cutting blade for rearward dislodgement on application of excessive force.

2. A forage harvester reel as set forth in claim 1 wherein said first fastening means on each mounting block has less shear strength than said second fastening means securing said mounting block to said respective supporting means.

3. A forage harvester reel as set forth in claim 1 wherein said cutting blades are spiral in shape and said end surfaces are contoured to the spiral configuration.

4. A forage harvester reel as set forth in claim 1 wherein said support means comprise six support plates in three pair with the two support plates in each pair spaced the width of said mounting blocks attached thereto, each plate having two rows of circular concentric rows of holes and said fastening means including bolts extending through said holes for securing the mounting blocks thereto in different number of sets of mounting blocks for forming the reel with different number of cutting blades.

5. A forage harvester reel as set forth in claim 1 wherein there is provided vertical side walls at each end of said reel, respectively, opposed guide pins and means for retractably mounting said opposed guide pins on the opposite side of said walls from said reel and spaced from the shaft approximately the same distance as the cutting periphery of said blades and positionable to overlap with the ends of said blades for initially and uniformly setting said blades on the mounting blocks.

6. A forage harvester reel as set forth in claim 5 wherein said mounting means for said guide pins comprises U-shaped bracket perpendicular to the respective side walls having respective base portion spaced from said respective side wall, said base portions having square shaped openings aligned with corresponding square shaped openings in said side wall, said guide pins having corresponding square shapes and slideably mounted in said respective openings, pinned washers between said respective base portions and said wall, helical springs about said respective guide pins and between said respective side walls and said respective pinned washers to urge said guide pins to retracted, exterior, nonguiding positions and bores in said guide pins to receive retention members fitting in said bores on the inner side of said base portion facing said side walls to hold said guide pins in the guiding position.

7. In a forage harvester having a rotatably mounted reel with cutting blades extending longitudinally thereon and side walls at opposite ends of said reel, blade positioning means comprising a pair of opposed bracket means mounted on the sides of said walls opposite to said reel, pin means mounted in said respective bracket means and extendible through said respective side walls in reciprocal relation therewith and adjacent to the edges of said cutting blades to position said cutting blades on the reel.

8. In a forage harvester as set forth in claim 7 wherein retention means are provided on said bracket means and said pin means to hold said pins in an inserted blade setting position.

9. In a forage harvester as set forth in claim 7 wherein said first and second pin means are aligned.

10. In a forage harvester as set forth in claim 7 wherein said first and second pin means are circumferentially offset.

11. In a forage harvester as set forth in claim 10 wherein said cutting blades have spiral configurations and said pin means are offset so that the opposite ends of a given blade are positionable in relation to said first and second pin means in a single position.

12. In a forage harvester as set forth in claim 7 wherein said first and second bracket means have portions spaced from said respective side walls and said portions and side walls have openings with said pin means extending therethrough for guiding said pins in the reciprocal relation.

* * * * *